United States Patent
Ku et al.

(10) Patent No.: US 8,211,498 B2
(45) Date of Patent: Jul. 3, 2012

(54) MESOPOROUS MEMBRANES WITH COMPLEX FUNCTIONAL ARCHITECTURES AND METHODS FOR MAKING

(75) Inventors: Anthony Yu-Chung Ku, Rexford, NY (US); Seth Thomas Taylor, Niskayuna, NY (US); Mohan Manoharan, Bangalore (IN); Sergio Paulo Martins Loureiro, Glastonbury, CT (US); James Anthony Ruud, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 340 days.

(21) Appl. No.: 12/483,294

(22) Filed: Jun. 12, 2009

(65) Prior Publication Data

US 2009/0280246 A1 Nov. 12, 2009

Related U.S. Application Data

(62) Division of application No. 11/315,209, filed on Dec. 23, 2005, now abandoned.

(51) Int. Cl.
B05D 5/00 (2006.01)

(52) U.S. Cl. .......... 427/243; 264/42; 977/893; 427/261; 427/256; 427/419.3

(58) Field of Classification Search .......... 427/243–247, 427/376.2, 376.4, 258, 261, 419.3; 428/307.7; 502/439; 977/893; 264/42
See application file for complete search history.

(56) References Cited

U.S. PATENT DOCUMENTS

| | | | |
|---|---|---|---|
| 6,645,571 B1 * | 11/2003 | Takai et al. | 427/553 |
| 7,084,002 B2 * | 8/2006 | Kim et al. | 438/104 |
| 2005/0079337 A1 | 4/2005 | Hashida et al. | |
| 2005/0208100 A1 | 9/2005 | Weber et al. | |
| 2005/0266227 A1 * | 12/2005 | Ku et al. | 428/304.4 |
| 2006/0266700 A1 | 11/2006 | Ku et al. | |
| 2008/0006574 A1 | 1/2008 | Ramaswamy et al. | |

OTHER PUBLICATIONS

Growth of Oxide Nanorod Arrays through Sol Electrophoretic Deposition Guozhong Cao The Journal of Physical Chemistry B 2004 108 (52), 19921-19931.*

Periodic mesoporous organosilicas with organic groups inside the channel walls Tewodros Asefa, Mark J. MacLachlan, Neil Coombs & Geoffrey A. Ozin Nature 402, 867-871 (Dec. 23, 1999).*

Dag et al., "Oriented Periodic Mesoporous Organosilica (PMO) Film With Organic Functionality Inside the Channel Walls", Adv. Funct. Mater., vol. 11, No. 3, pp. 213-217, 2001.

Asefa et al., "Periodic Mesoporous Organosilicas With Organic Groups Inside the Channel Walls", Nature, vol. 402, pp. 867-871, Dec. 1999.

Doshi et al., "Optically Defined Multifunctional Patterning of Photosensitive Thin-Film Silica Mesophases", Science, vol. 290, pp. 107-111, Oct. 6, 2000.

* cited by examiner

*Primary Examiner* — Frederick Parker
*Assistant Examiner* — Alex Rolland
(74) *Attorney, Agent, or Firm* — Paul J. DiConza

(57) ABSTRACT

In some embodiments, the present invention is directed to methods of making structures with complex functional architectures, where such structures generally comprise at least two mesoporous regions comprising different chemical activity, and where such methods afford spatial control over the placement of such regions of differing chemical activity. In some embodiments, the present invention is also directed to the structures formed by such methods, where such structures are themselves novel.

13 Claims, 16 Drawing Sheets

TYPE 1　　　　　　　　TYPE 2

500 nm

US 8,211,498 B2

MESOPOROUS MEMBRANES WITH COMPLEX FUNCTIONAL ARCHITECTURES AND METHODS FOR MAKING

This application is a divisional of application Ser. No. 11/315,209, filed 23 Dec. 2005, which is hereby incorporated by reference herein in its entirety.

TECHNICAL FIELD

The present invention relates generally to mesoporous structures, and more specifically to complex mesoporous architectures comprising ceramic/organic hybrid structures with distinct mesoporous domains having different chemical functionalities.

BACKGROUND INFORMATION

There is a well-established need for mesoporous oxide structures with tunable chemical activity for use as filters, reactors or sensors. One way to impart specific chemical functionality to such structures is to embed organic functionalities into the walls or onto the surfaces of the mesoporous oxides. These groups are either chemically active or can be further reacted to form chemically-active sites. Mesoporous ceramic structures with organic functionalities embedded in the walls and on the pore surfaces have been produced (Dag et al., "Oriented Periodic Mesoporous Organosilica (PMO) Film with Organic Functionality Inside the Channel Walls," Adv. Funct. Mater. 11, 213-217 (2001); and Asefa et al., "Periodic mesoporous organosilicas with organic groups inside the channel walls," Nature, 402, 867-871 (1999)). Commonly referred to as periodic mesoporous organosilicas (PMOs), these materials are generally formed as powders. Usually, aqueous based processing methods are used in their fabrication, although there are some references to alcohol-based processing methods which can produce such mesoporous films.

The primary limitation with the current above-described PMO methods is that the materials produced are structurally homogeneous. There is a need for multiple organic functionalities within a mesoporous structure and also for spatial separation of the mesoporous regions with these sites—needs that the above-described PMO methods do not currently meet.

Presently, organic groups can be incorporated into the walls of mesoporous silica in two ways. The first approach is a sequential process in which the mesoporous structure is formed, followed by deposition of a layer containing the desired organic groups. It is difficult to use this approach to produce regions with distinct organic groups because methods for selective deposition into targeted pore regions without simultaneous deposition onto other regions is considerably difficult. One method for accomplishing this was detailed in Doshi et al., "Optically Defined Multifunctional Patterning of Photosensitive Thin-Film Silica Mesophases," Science, 290, 107-111 (2000), which describes the incorporation of a photoacid into a mesoporous structure and where ultraviolet (UV) light was used to selectively activate the structure in illuminated regions. However, this method cannot be universally applied because not all groups are responsive to photopatterning. The second approach is a single step process in which a precursor for the functional groups is incorporated into the precursor solution for the mesoporous oxide. Again, with this second approach, spatial control of the functional groups is lacking.

As a result of the foregoing, a more universal method of imparting differential chemical activity to pre-defined mesoporous regions within a structure so as to afford spatial control over the placement of such regions would be highly desirable.

BRIEF DESCRIPTION OF THE INVENTION

In some embodiments, the present invention is directed to methods of making mesoporous membrane structures with complex functional architectures, where, in some such embodiments, such structures generally comprise at least two mesoporous regions comprising different chemical activity, and where such methods afford spatial control over the placement of such regions of differing chemical activity within the overall structure. In some embodiments, the present invention is also directed to the mesoporous structures formed by such methods, where such structures are themselves novel.

In some embodiments, the present invention is directed to methods of a first type comprising the steps of: (a) providing a framework in which a mesoporous ceramic can be generated; (b) depositing, in a first region of the framework, a first precursor mixture; (c) treating the first precursor mixture so as to form a region of mesoporous ceramic substructure comprising a first chemical activity; (d) depositing, in a second region of the framework adjacent to, or separated from, the region of mesoporous ceramic substructure comprising a first chemical activity, a second precursor mixture; and (e) treating the second precursor mixture so as to form a region of mesoporous ceramic substructure comprising a second chemical activity, wherein the regions of mesoporous ceramic substructure of first and second chemical activity provide for a mesoporous membrane structure comprising regions of mesoporous ceramic of different chemical activity; wherein both of the first and second precursor mixtures comprise a quantity of a self-assembling surfactant species, a quantity of ceramic precursor, and wherein at least one of the first and second precursor mixtures comprises a species for imparting organic-based chemical activity to the region in which it is present.

In some embodiments, the present invention is directed to methods of a second type comprising the steps of: (a) depositing, on a substrate, a layer of a first mesoporous ceramic precursor mixture; (b) treating the first precursor mixture so as to form a mesoporous ceramic substructure layer comprising a first chemical activity; (c) depositing, on the mesoporous ceramic substructure layer comprising a first chemical activity, a second precursor mixture; and (d) treating the second precursor mixture so as to form a mesoporous ceramic substructure layer comprising a second chemical activity, wherein the mesoporous ceramic substructure layers of first and second chemical activity provide for a mesoporous membrane structure of mixed chemical activity.

In some embodiments, the present invention is directed to mesoporous membrane structures comprising at least two chemically-distinct mesoporous ceramic regions, wherein at least one such region comprises organic functionality, wherein the mesoporous regions are in fluid communication with each other, and wherein the regions are further differentiated by at least one property selected from the group consisting of pore morphology, bulk chemical composition, and combinations thereof.

In some embodiments, the present invention is directed to mesoporous membrane structures comprising at least two mesoporous ceramic regions of substantially similar bulk chemical composition and pore morphology, wherein the regions are in fluid communication with each other, wherein at least one such region comprises organic functionality, and wherein at least one such region is substantially devoid of organic functionality.

In some embodiments, the present invention is directed to mesoporous membrane structures comprising at least two morphologically-distinct mesoporous ceramic regions, wherein the regions are in fluid communication with each other, and wherein at least one such region comprises organic functionality.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
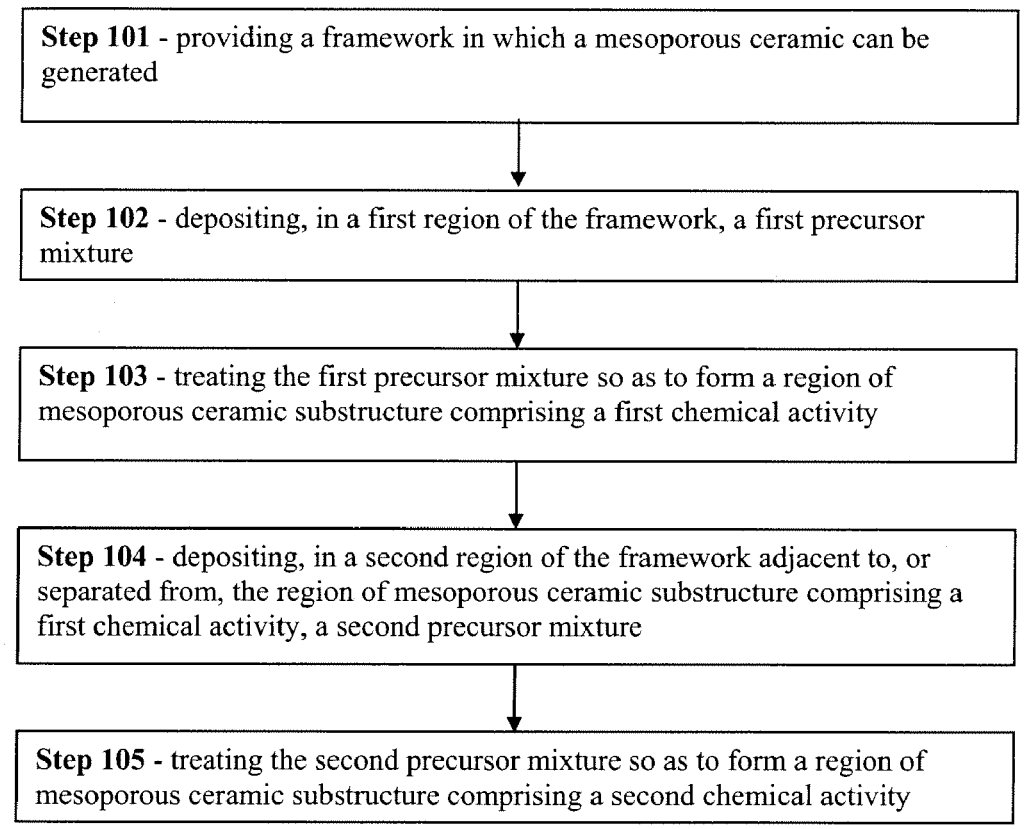
FIG. 1 depicts, in flow diagram form, methods of a first type for making mesoporous membrane structures with complex architectures comprising regions of differential chemical activity, in accordance with some embodiments of the present invention.

In some embodiments, the present invention is directed to methods of making mesoporous membrane structures with complex functional architectures, where, in some such embodiments, such structures generally comprise at least two mesoporous regions comprising different chemical activity, and where such methods afford spatial control over the placement of such regions of differing chemical activity within the overall structure. In some embodiments, the present invention is also directed to the mesoporous membrane structures formed by such methods, wherein such structures are themselves novel.

In the following description, specific details are set forth such as specific quantities, sizes, etc. so as to provide a thorough understanding of embodiments of the present invention. However, it will be obvious to those skilled in the art that the present invention may be practiced without such specific details. In many cases, details concerning such considerations and the like have been omitted inasmuch as such details are not necessary to obtain a complete understanding of the present invention and are within the skills of persons of ordinary skill in the relevant art.

Referring to the drawings in general, it will be understood that the illustrations are for the purpose of describing a particular embodiment of the invention and are not intended to limit the invention thereto.

"Mesoporous," as defined herein, refers to porous materials comprising ordered, accessible pores with free diameters of less than 50 nm.

Referring to FIG. 1, in some embodiments, the present invention is directed to methods of a first type comprising the steps of: (Step 101) providing a framework in which a mesoporous ceramic can be generated; (Step 102) depositing, in a first region of the framework, a first precursor mixture; (Step 103) treating the first precursor mixture so as to form a region of mesoporous ceramic substructure comprising a first chemical activity; (Step 104) depositing, in a second region of the framework adjacent to, or separated from, the region of mesoporous ceramic substructure comprising a first chemical activity, a second precursor mixture; and (Step 105) treating the second precursor mixture so as to form a region of mesoporous ceramic substructure comprising a second chemical activity, wherein the regions of mesoporous ceramic substructure of first and second chemical activity provide for a mesoporous membrane structure comprising regions of mesoporous ceramic of different chemical activity; wherein both of the first and second precursor mixtures comprise a quantity of a self-assembling surfactant species, a quantity of ceramic precursor, and wherein at least one of the first and second precursor mixtures comprises a species for imparting organic-based chemical activity to the region in which it is present.

Herein, when referring to a particular region, such a region, in accordance with invention embodiments, need not be continuous, but generally comprises common physical and chemical characteristics, and, if physically separated into discrete sub-regions, such sub-regions are maintained in fluid communication with each other (vide infra).

In some of the above-described embodiments involving methods of a first type, there exists a further step of depositing additional precursor mixtures into additional regions of the framework, wherein such additional precursor mixtures are treated so as to form additional regions of mesoporous ceramic substructure comprising additional chemical activities, and wherein this additional precursor mixture deposition and treatment provides for a structure comprising at least three chemically-distinct mesoporous ceramic regions.

In some of the embodiments involving the first type of methods, the methods provide positional (i.e., spatial) control over the depositional placement of the first and/or second precursor mixtures and over spatial positioning of the regions of mesoporous ceramic substructure so formed. Such positional control can provide for a variety of complex architectures.

In some of the above-described embodiments involving methods of a first type, there exists a further step of removing at least part of the framework. In some such embodiments, the framework is completely removed to yield mesoporous ceramic nanorods. In some such embodiments, the chemical activity varies within individual nanorods. In some such embodiments, the chemical activity varies between individual nanorods.

In some of the above-described embodiments involving methods of a first type, the framework comprises a material such as, but not limited to, polymeric materials, ceramic materials, semiconductor materials, metals, glasses, and combinations thereof. In some such embodiments, the framework is a templated material. An exemplary such material is anodized aluminum oxide (AAO), also referred to as "anodic alumina."

In some of the above-described embodiments involving methods of a first type, the first and second precursor mixtures comprise a liquid medium in which the self-assembling surfactant species and the ceramic precursor are dispersed and/or dissolved. In some such embodiments, the liquid medium(s) comprises an aqueous and/or alcohol solvent. In some such embodiments, the liquid medium(s) comprise additional additive such as, but not limited to, acids, bases, salts, and combinations thereof. Exemplary self-assembling surfactant species include, but are not limited to, PEO-PPO block co-polymers such as F127, P123, and the like. Exemplary ceramic precursor species include, but are not limited to, colloidal silica, silanes (e.g., tetraethoxyorthosilicate, tetramethyoxyorthosilicate), and the like.

In some of the above-described embodiments involving methods of a first type, the domain size of the mesoporous regions is tunable. Such tunability is also possible with regard to the size of the pores in a particular mesoporous region. In some embodiments involving the latter case, such tunability is afforded by judicious selection of the self-assembling surfactant species.

In some of the above-described embodiments involving methods of a first type, at least one of the first and second chemical activities is at least partially-derived from organic-based molecules covalently-integrated with the region of mesoporous ceramic substructure with which it is associated. In some such embodiments, the organic-based molecules comprise functional moieties selected from the group consisting of alkyl, mercapto, carboxyl, vinyl, amine, benzyl and combinations thereof.

In some of the above-described embodiments involving methods of a first type, the regions of mesoporous ceramic substructure comprise a bulk composition selected from the group consisting of $SiO_2$, $TiO_2$, $Al_2O_3$, $ZrO_2$, $Y_2O_3$:$ZrO_2$, $Y_2O_3$, and combinations thereof.

Chemical activity can be native to the material of the ceramic substructure layer, or it can be imparted through the addition of organic additives. As mentioned above, to impart organic-based chemical activity to at least one of the first and/or second precursor mixtures, an organic additive is added to one or both of the first and/or second precursor mixtures. Exemplary organic additives include, but are not limited to, mercaptopropyltriethoxysilane, triethoxyvinylsilane, and the like.

In some embodiments involving methods of a first type, the ceramic precursor species itself comprises organic functional groups which impart organic-based chemical activity to the resulting mesoporous membrane structure. Exemplary such species include, but are not limited to, organosilanes, e.g., mercaptosilane.

In the above-described embodiments involving methods of a first type, treating the first and second precursor mixtures so as to form regions of mesoporous ceramic substructure typically comprise a solvent removal procedure. Such solvent removal can be enhanced by heat and/or vacuum. Such treatment generally further comprises removal of the self-assembling surfactant species and conversion of the ceramic precursor species to a ceramic species, the latter possessing mesoporosity by virtue of the self-assembling surfactant species previously present. To achieve these latter outcomes, sufficient heat (so as to effect the decomposition of the self-assembling surfactant species and convert the ceramic precursor into a ceramic) and/or a suitable chemical species may be added.

Figure 2:
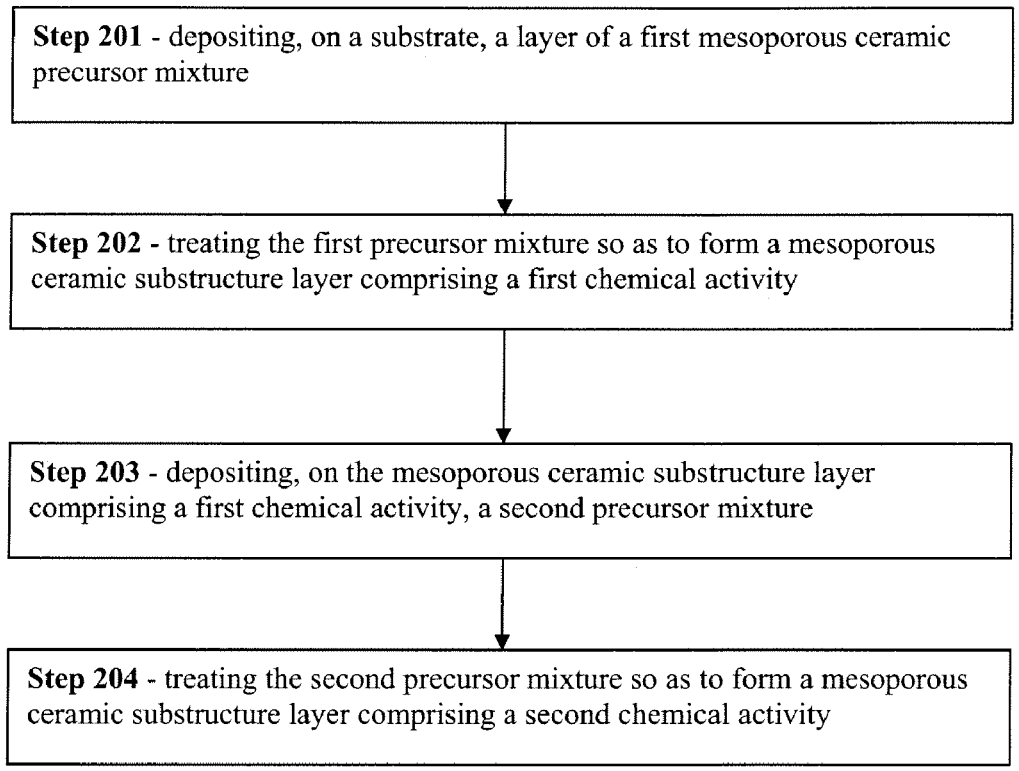
FIG. 2 depicts, in flow diagram form, methods of a second type for making mesoporous membrane structures with complex architectures comprising regions of differential chemical activity, in accordance with some embodiments of the present invention.

Referring to FIG. 2, in some embodiments, the present invention is directed to methods of a second type comprising the steps of: (Step 201) depositing, on a substrate, a layer of a first mesoporous ceramic precursor mixture; (Step 202) treating the first precursor mixture so as to form a mesoporous ceramic substructure layer comprising a first chemical activity; (Step 203) depositing, on the mesoporous ceramic substructure layer comprising a first chemical activity, a second precursor mixture; and (Step 204) treating the second precursor mixture so as to form a mesoporous ceramic substructure layer comprising a second chemical activity, wherein the mesoporous ceramic substructure layers (i.e., layered regions) of first and second chemical activity provide for a mesoporous membrane structure of mixed chemical activity.

In some of the above-described embodiments involving methods of a second type, the step of depositing comprises a casting or printing process. In some such embodiments, the depositing involves spin casting.

In some of the above-described embodiments involving methods of a second type, there exists a further step of removing the mesoporous ceramic structure of mixed chemical activity from the substrate on which it was formed.

In some of the above-described embodiments involving methods of a second type, there exists a further step of forming at least one additional mesoporous ceramic substructure layer within the mesoporous ceramic membrane structure of mixed chemical activity, wherein adjacent layers possess different chemically activity. In some such embodiments, the mesoporous ceramic membrane structure of mixed chemical activity comprises at least three chemically-distinct mesoporous ceramic substructure layers.

In some of the above-described embodiments involving methods of a second type, the mesoporous ceramic substructure layer comprising a first chemical activity at least partially derives its chemical activity from organic molecules that are covalently integrated with the mesoporous ceramic substructure layer. In some such embodiments, the organic molecules comprise functional moieties selected from the group consisting of alkyl, mercapto, carboxyl, vinyl, amine, benzyl, and combinations thereof. In some such embodiments, the first and second chemical activities are differentiable and at least partially derived from differences in bulk composition between the substructure layers.

In some of the above-described embodiments involving methods of a second type, the mesoporous ceramic substructure layers comprise a bulk composition selected from the group consisting of $SiO_2$, $TiO_2$, $Al_2O_3$, $ZrO_2$, $Y_2O_3:ZrO_2$, $Y_2O_3$, and combinations thereof.

For embodiments involving methods of a second type, mesoporous ceramic precursor mixtures are generally as described above for methods of a first type and generally comprise self-assembling surfactant species and ceramic precursor species in like manner. Also in like manner, organic-based chemical activity, and species for imparting same, are generally as described above for methods of a first type.

For embodiments involving methods of a second type, methods of treating precursor mixtures are generally performed as described above for methods of a first type.

Variations on method embodiments of a first or second type include, but are not limited to, scenarios where the chemical activity can be the same or different from mesoporous region to mesoporous region, but wherein such regions are differentiable by pore morphology and/or bulk chemical composition.

In any of the above-described method embodiments, wherein the mesoporous membrane structures so produced comprise regions that comprise organic functionality, the structure can be further modified by treating the organic functionality with a second organic, organometallic, or metallic substance. For example, vinylsilica can be modified with an organic compound that forms a covalent bond through reaction with the vinylic double bond. Another example is the adsorption of cis-platin (CP, cis-[Pt(NH$_3$)$_2$Cl$_2$]) onto the mercaptosilica. A third example is the adsorption of gold nanoparticles onto mercaptosilicas or the binding of platinum (Pt) or palladium (Pd) nanoparticles onto amine-functionalized silica. Another example is the incorporation of platinum-containing organometallic species comprising a vinyl moiety, such as platinum(0)-1,3-divinyl-1,1,3,3-tetramethyldisiloxane. Both Pt and Pd can be incorporated as organometallic functionality through alkyl-alkyl or vinyl-vinyl complexes.

In some embodiments, the present invention is directed to mesoporous membrane structures of a first type comprising at least two chemically-distinct mesoporous ceramic regions, wherein at least one such region comprises organic functionality, wherein the mesoporous regions are in fluid communication with each other, and wherein the regions are further differentiated by at least one property selected from the group consisting of pore morphology, bulk chemical composition, and combinations thereof.

In some embodiments, the present invention is directed to mesoporous membrane structures of a second type comprising at least two mesoporous ceramic regions of substantially similar bulk chemical composition and pore morphology, wherein the regions are in fluid communication with each other, wherein at least one such region comprises organic functionality, and wherein at least one such region is substantially devoid of organic functionality.

In some embodiments, the present invention is directed to mesoporous membrane structures of a third type comprising at least two morphologically-distinct mesoporous ceramic regions, wherein the regions are in fluid communication with each other, and wherein at least one such region comprises organic functionality.

In some such above-described structural embodiments, the organic functionality emanates from organic-based molecules covalently-integrated into the at least one region comprising such functionality. In some such embodiments, pore morphology is differentiable between regions if the average pore size of such regions differs by at least about 10 percent or if the pore organization is different (e.g., as determined by small angle X-ray scattering).

In some such above-described embodiments directed to mesoporous membrane structures, the bulk chemical composition of the mesoporous ceramic regions is selected from the group consisting of $SiO_2$, $TiO_2$, $Al_2O_3$, $ZrO_2$, $Y_2O_3:ZrO_2$, $Y_2O_3$, and combinations thereof. In some such embodiments, the organic functionality comprises moieties selected from the group consisting of alkyl, mercapto, carboxyl, vinyl, amine, benzyl, and combinations thereof. In some such embodiments, the mesoporous ceramic regions comprise pores having an average pore size of between about 1 nm and about 40 nm. In some such embodiments, the average pore size comprises a standard deviation of between about ±0.1 nm and about ±10 nm.

"Fluid communication," as defined herein, refers to an ability to transport fluids between two mesoporous regions. Fluid transport through and between the mesoporous regions generally occurs within the pores. The rate of transport within a region depends on the identity of the fluid, the pore morphology, and, optionally, the bulk chemical structure and organic functionality of the mesoporous regions. For example, the relative Knudsen diffusion rates of two gases within a mesoporous region will depend on the square root of the molecular weight ratio. The rate of transport between regions depends on the identity of the fluid, the pore morphologies of the regions, the macroscopic size and shape of the regions, and, optionally, on the bulk chemical structures and organic functionalities. For example, the time scale associated with the diffusion of a gas from one region into a second region depends on the mechanism of diffusion and the size of the regions. Transport from the center of a region with a macroscopic size of 10 μm to a second region with a macroscopic size of 10 μm would take longer than transport from region with a macroscopic size of 100 nm to a second region with a macroscopic size of 100 nm.

Figure 3A:
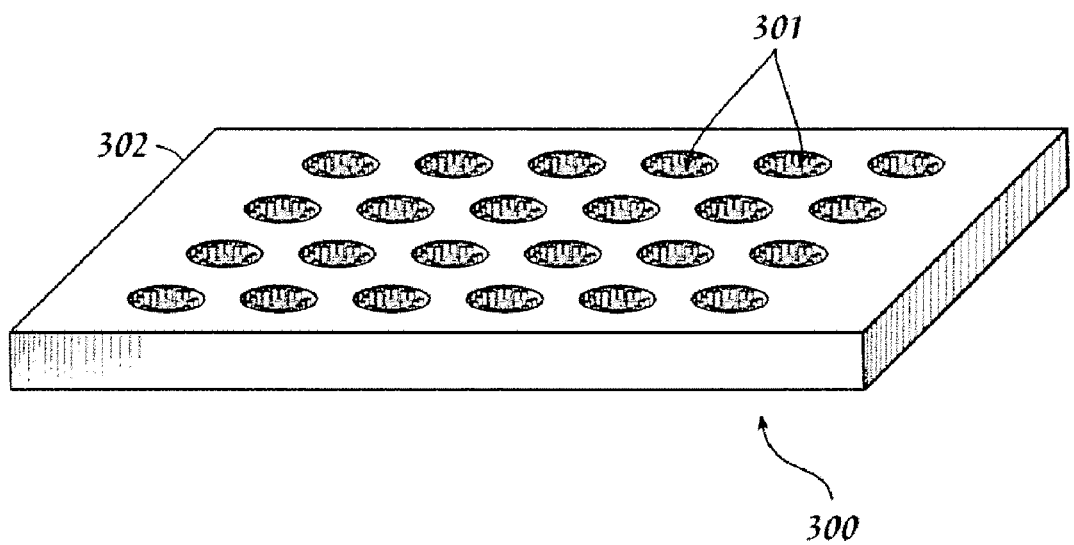
FIGS. 3A-3C schematically illustrate a mesoporous membrane structures with complex architecture comprising regions of differential chemical activity and morphology, in accordance with some embodiments of the present invention.
Figure 3B:
Figure 3B:
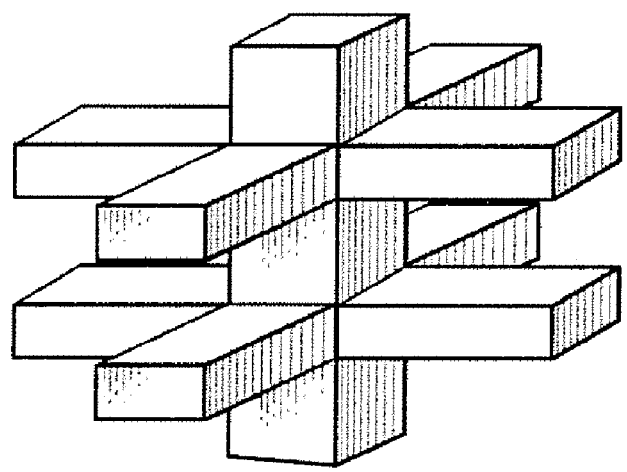
Figure 3C:
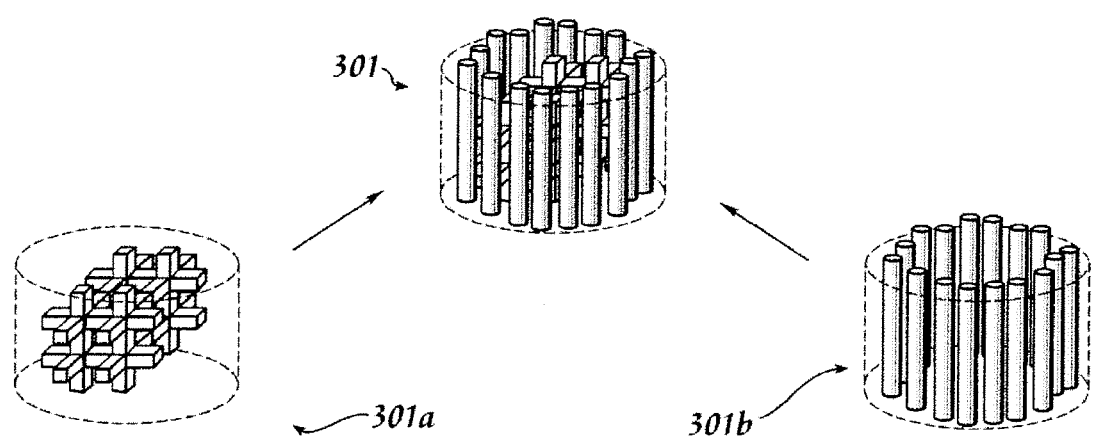

FIG. 3(A) schematically illustrates an exemplary mesoporous membrane structure 300 comprising mesoporous areas 301 in a structural framework 302, in accordance with some embodiments of the present invention. Referring to FIG. 3(C), mesoporous areas 301 can be seen to comprise a first mesoporous region 301a comprising a first chemical activity and second mesoporous region 301b comprising a second chemical activity. In FIG. 3, mesoporous regions 301a and 301b are interspersed with each other, region 301a comprising a pore morphology of cubic organization provided by the Type 2 structural elements depicted in FIG. 3(C). In contrast, region 301b comprises a pore morphology of hexagonal organization provided by the Type 1 structural elements depicted in FIG. 3(C).

Methods of the present invention permit the formation of mesoporous membrane structures with spatially-controlled placement of distinct chemical groups within the mesoporous structure. It is important to note that the chemical activity of the mesoporous regions, particularly the spatial positioning of such chemical activity and wherein such chemical activity is organic-based, is not dependent upon photoactivation to impart variations thereof. Such methods and structures enable applications related to fluid filtration and chemical reactivity/catalysis such as metal removal from water streams, preconcentration of chemical species in gas streams, multi-step catalytic membranes, and biosensors (glucose oxidase) with separate pores to transport the reagents (glucose and oxygen). The applications described above serve as mere examples, since the method of making such structures is flexible enough to impart the desired level of differential functionality (chemical, catalytic, optical, electrical, etc.) into a structure.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

Figure 4:
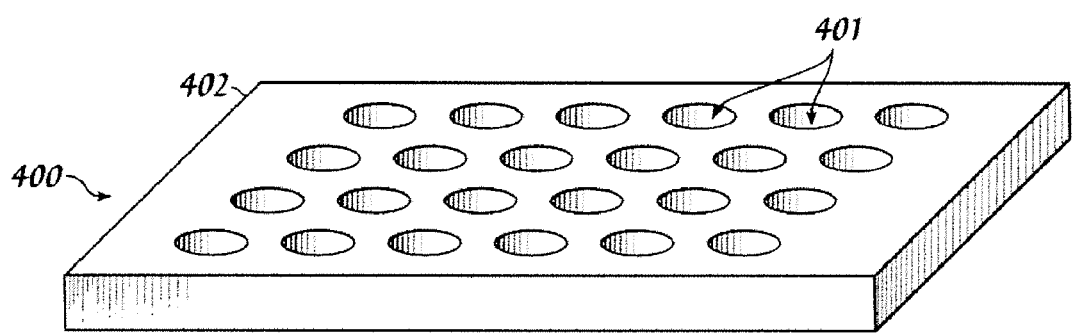
FIG. 4 illustrates an anodized aluminum oxide (AAO) template which is useful as a framework in the fabrication of mesoporous membrane structures with complex architectures comprising regions of differential chemical activity, in accordance with some embodiments of the present invention.

This Example serves to illustrate the synthesis of a F127-templated mercaptosilane in an AAO template (Sample 1), as shown in FIG. 4 where AAO template 400 comprises hollow channels 401 in a $Al_2O_3$ matrix 402.

Sample 1 was prepared using the following procedure: 3 g of F127 polymer was completely dissolved in 18 g ethanol and 6 g 0.4 M HCl. To this solution was added 7.7 g of tetraethoxysilane (TEOS), followed by 3.6 g of mercaptopropyltriethoxysilane after an hour of stirring. The solution was poured into a Petri dish containing AAO membranes (Whatman, 25 mm diameter, 50 µm thick, 200 nm pores) supported on polydimethylsiloxane (PDMS) blocks. Initially, the solution completely covered the membranes. The solution was allowed to evaporate at room temperature until the membranes were exposed by the receding fluid line. After 24 hours, the membranes were sealed in a jar with 100 g of ethanol and 1 g of KCl. The jar was heated to 80° C. for 2 days to remove the F127 template.

Figure 5:
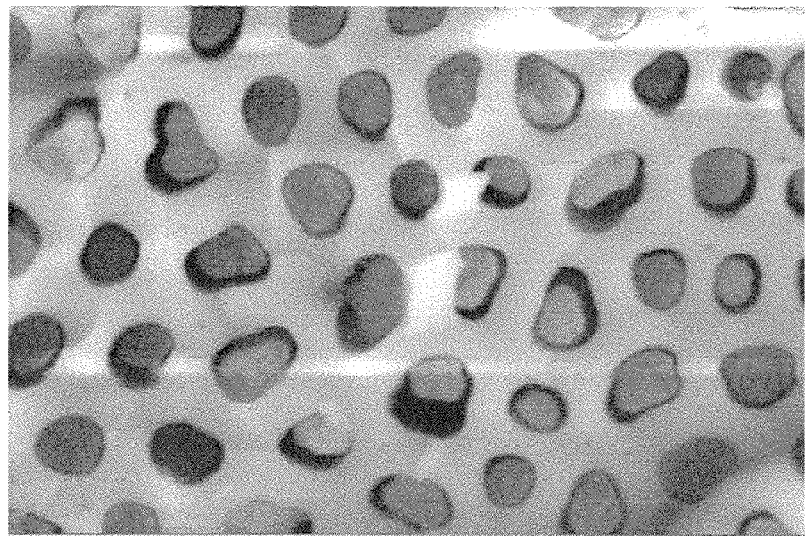
FIGS. 5A and 5B show cross-sectional (B) and plan view (A) SEM images of an AAO membrane that has been filled with F127-templated mercaptosilane.
Figure 5:
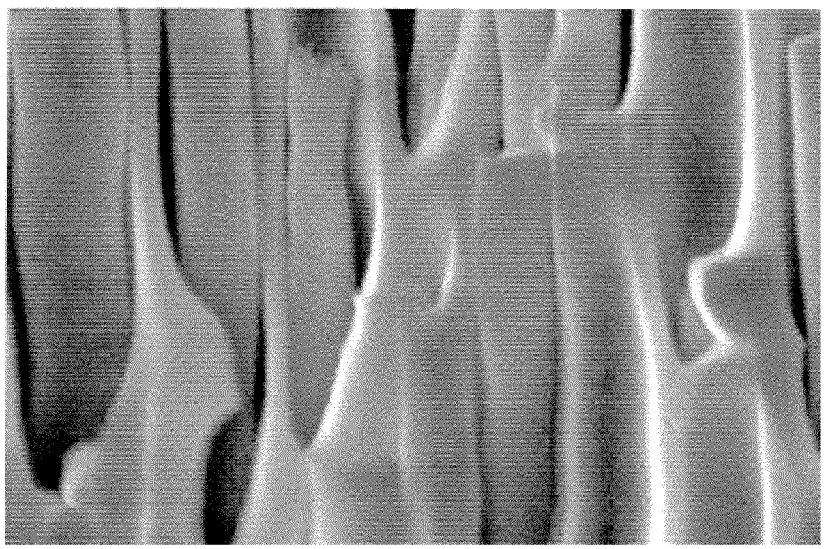

FIGS. 5A and 5B show cross-sectional (B) and plan view (A) scanning electron microscopy (SEM) images of the resulting AAO membrane filled with F127-templated mercaptosilane (Sample 1).

EXAMPLE 2

This Example serves to illustrate P123-templated silica and F127-templated mercaptosilane in an AAO template (Sample 2), thereby providing two mesoporous regions of different chemical activity.

Sample 2 was prepared using the following procedure: 3 g of P123 polymer was completely dissolved in 18 g ethanol and 6 g 0.4 M HCl. To this solution, 7.7 g of TEOS was added. The solution (first precursor mixture) was poured into a Petri dish containing AAO membranes (framework) (Whatman, 25 mm diameter, 50 µm thick, 200 nm pores) supported on PDMS blocks. Initially, the solution completely covered the membranes. The solution was allowed to evaporate at room temperature until the membranes were exposed by the receding fluid line. The membrane was then heated to 600° C. for 4 hours at a ramp rate of 1° C./min to treat the first precursor mixture.

The membrane was subjected to a second deposition step in which 3 g of F127 polymer was completely dissolved in 18 g ethanol and 6 g 0.4 M HCl. To this solution 7.7 g of TEOS was added, followed by 3.6 g of mercaptopropyltriethoxysilane after an hour of stirring. The solution (second precursor mixture) was poured into a Petri dish containing AAO membranes (Whatman, 25 mm diameter, 50 µm thick, 200 nm pores) supported on PDMS blocks. Initially, the solution completely covered the membranes. The solution was allowed to evaporate at room temperature until the membranes were exposed by the receding fluid line. After 24 hours, the membranes were sealed in a jar with 100 g of ethanol and 1 g of KCl. The jar was heated to 80° C. for 2 days to remove the F127 template and form the mesoporous membrane structures.

Figure 6:
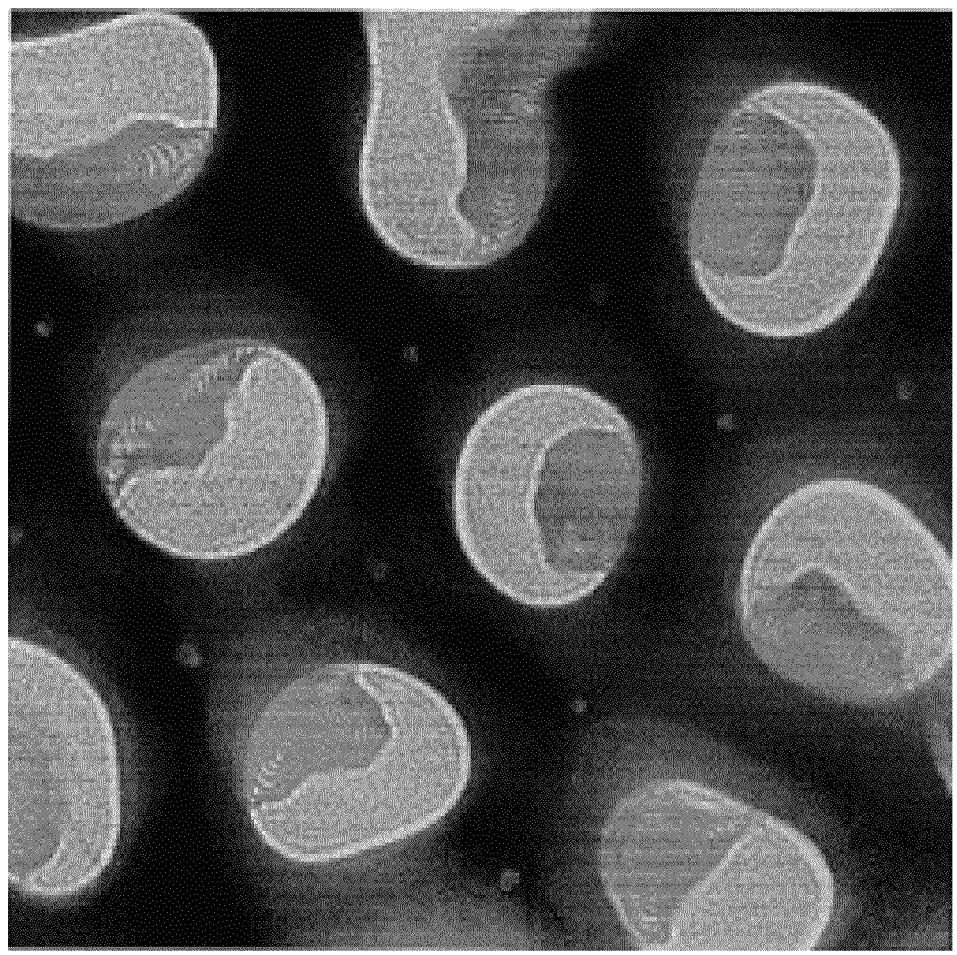
FIG. 6 shows a plan view TEM image of an AAO template containing a P123-templated SiO$_2$/F127-templated mercaptosilane composite structure, where complete filling of the AAO is realized, in accordance with some embodiments of the present invention.
Figure 7:
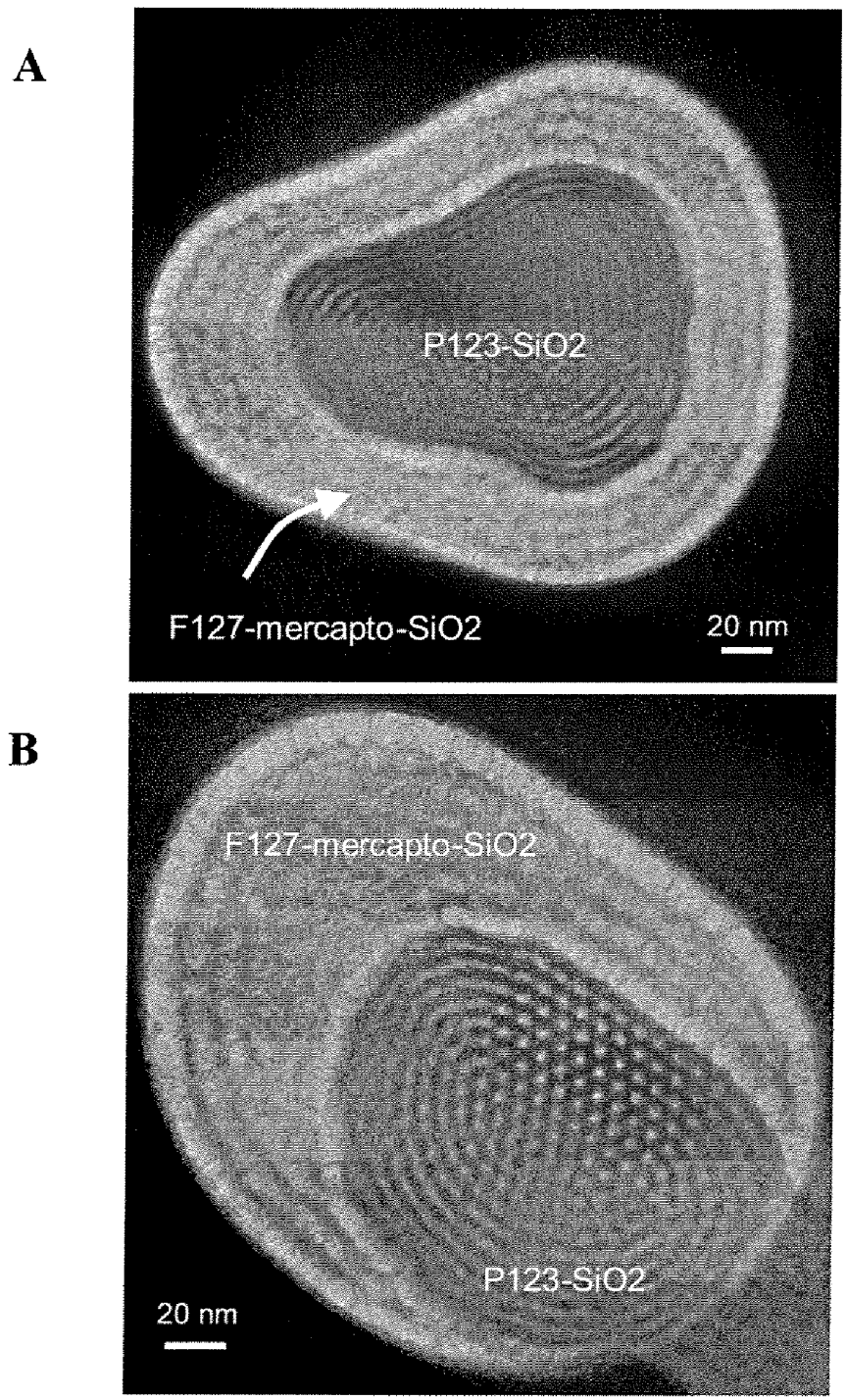
FIGS. 7A and 7B are enlarged views of the structure shown in FIG. 6.

FIG. 6 shows a plan view transmission electron microscopy (TEM) image of the resulting AAO template containing a P123-templated $SiO_2$/F127-templated mercaptosilane composite structure (Sample 2), where complete filling of the AAO is realized. FIGS. 7A and 7B are enlarged views of the structure shown in FIG. 6.

EXAMPLE 3

This Example serves to illustrate F127-templated vinylsilane in AAO (Sample 3).

Sample 3 was prepared using the following procedure: 3 g of F127 polymer was completely dissolved in 18 g ethanol and 6 g 0.4 M HCl. To this solution 7.7 g of TEOS was added, followed by 3.6 g of triethoxyvinylsilane after an hour of stirring. The solution was poured into a Petri dish containing AAO membranes (Whatman, 25 mm diameter, 50 µm thick, 200 nm pores) supported on PDMS blocks. Initially, the solution completely covered the membranes. The solution was allowed to evaporate at room temperature until the membranes were exposed by the receding fluid line. After 24 hours, the membranes were sealed in a jar with 100 g of ethanol and 1 g of KCl. The jar was heated to 80° C. for 2 days to remove the F127 template.

Figure 8:
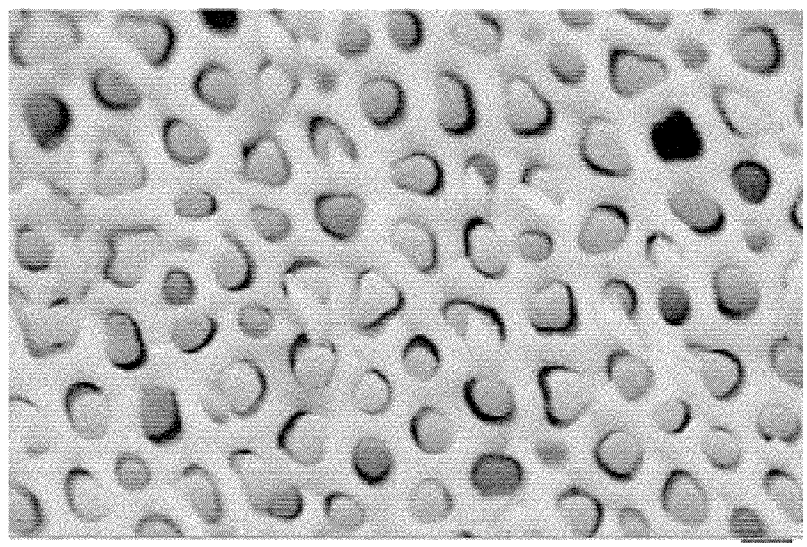
FIGS. 8A and 8B show cross-sectional (B) and plan view (A) SEM images of an AAO membrane that has been filled with F127-templated vinylsilane.
Figure 8:
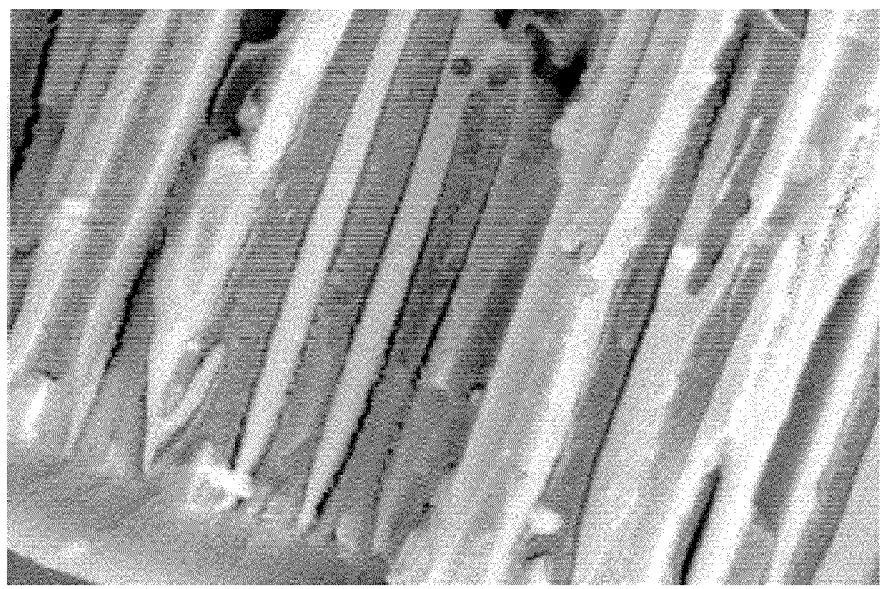

FIGS. 8A and 8B show cross-sectional (B) and plan view (A) SEM images of the resulting AAO membrane that has been filled with F127-templated vinylsilane (Sample 3).

EXAMPLE 4

This Example serves to illustrate P123-templated silica and F127-templated vinylsilane in AAO (Sample 4).

Sample 4 was prepared using the following procedure: 3 g of P123 polymer was completely dissolved in 18 g ethanol and 6 g 0.4 M HCl. To this solution, 7.7 g of TEOS was added. The solution (first precursor mixture) was poured into a Petri dish containing AAO membranes (Whatman, 25 mm diameter, 50 µm thick, 200 nm pores) supported on PDMS blocks. Initially, the solution completely covered the membranes. The solution was allowed to evaporate at room temperature until the membranes were exposed by the receding fluid line. The membrane was then heated to 600° C. for 4 hours at a ramp rate of 1° C./min.

The membrane was subjected to a second deposition step in which 3 g of F127 polymer was completely dissolved in 18 g ethanol and 6 g pH 0.4 HCl. To this solution 7.7 g of TEOS was added, followed by 3.6 g of triethoxyvinylsilane after an hour of stirring. The solution (second precursor mixture) was poured into a Petri dish containing AAO membranes (Whatman, 25 mm diameter, 50 µm thick, 200 nm pores) supported on PDMS blocks. Initially, the solution completely covered the membranes. The solution was allowed to evaporate at room temperature until the membranes were exposed by the receding fluid line. After 24 hours, the membranes were sealed in a jar with 100 g of ethanol and 1 g of KCl. The jar was heated to 80° C. for 2 days to remove the F127 template.

Figure 9:
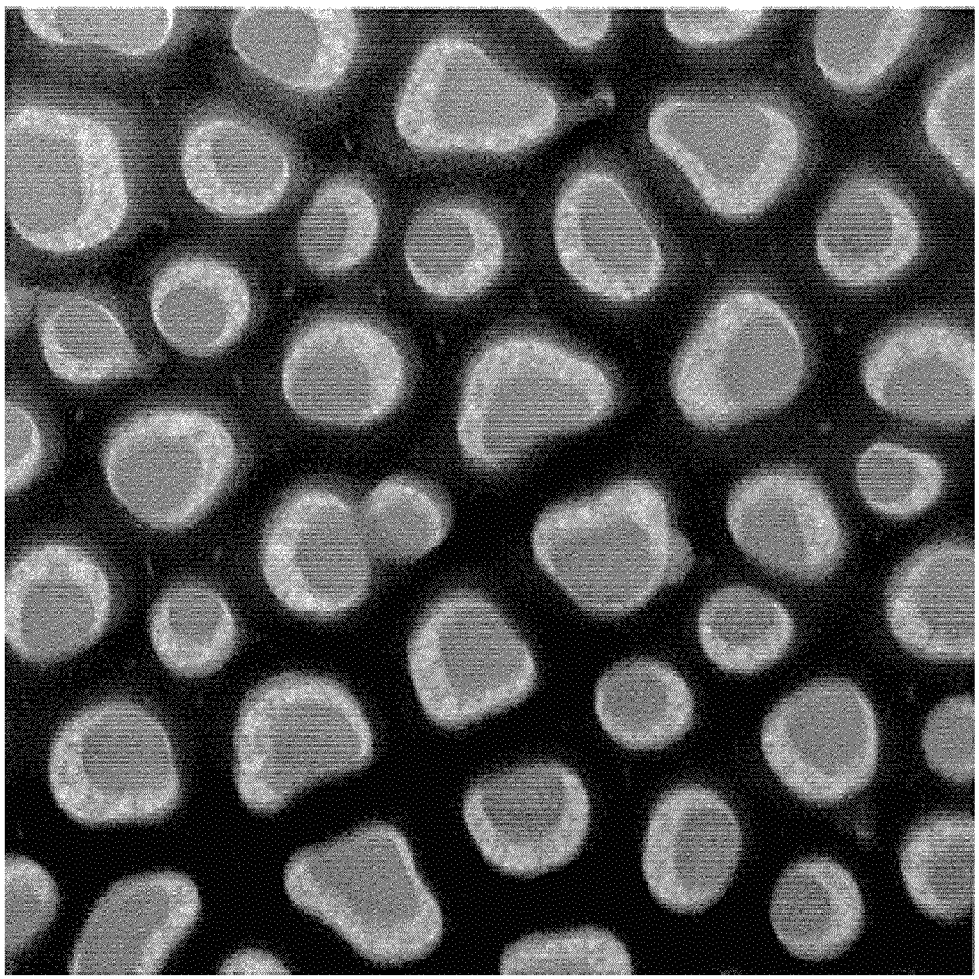
FIG. 9 shows a plan view TEM image of an AAO template containing a P123-templated SiO$_2$/F127-templated vinylsilane composite structure, where complete filling of the AAO is realized, in accordance with some embodiments of the present invention.
Figure 10:
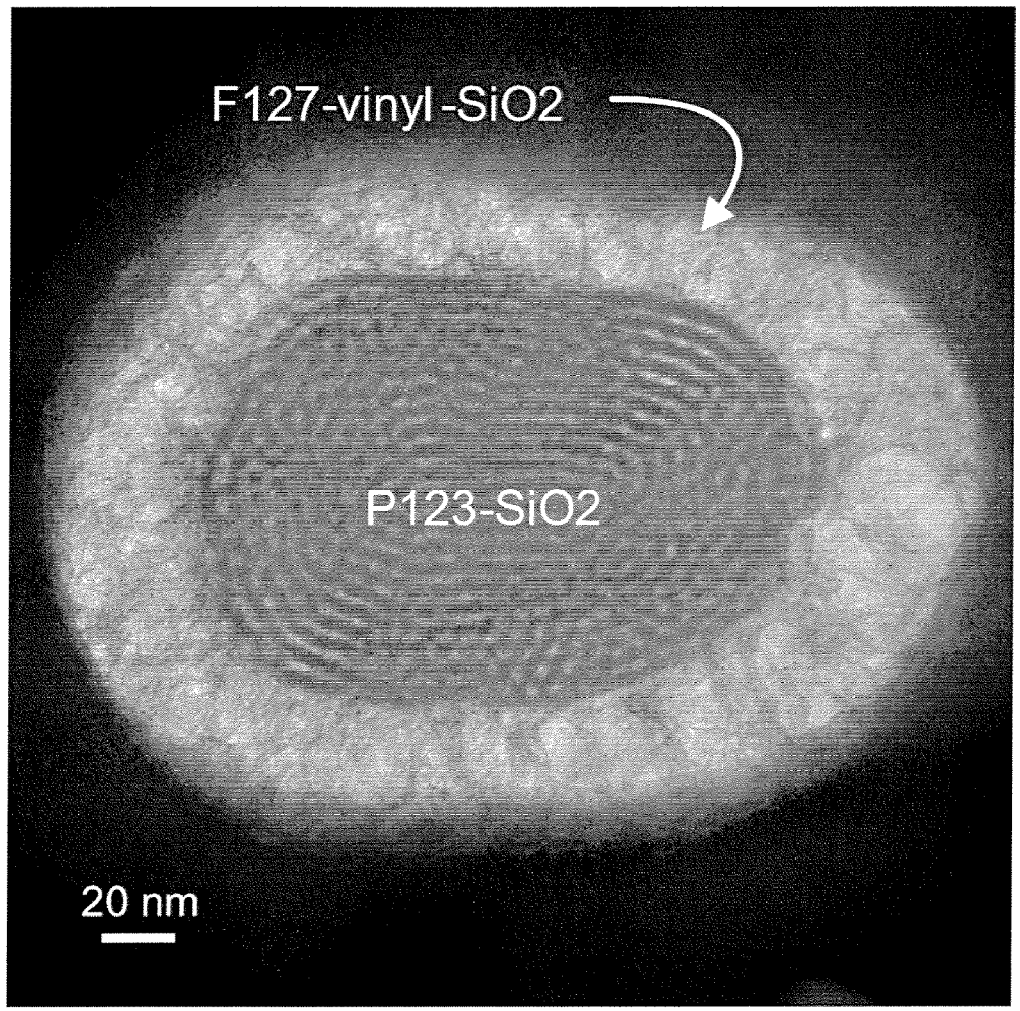
FIG. 10 is magnified region of the structure shown in FIG. 9.

FIG. 9 shows a plan view TEM image of the resulting AAO template containing a P123-templated $SiO_2$/F127-templated vinylsilane composite structure (Sample 4), where complete filling of the AAO is realized. FIG. 10 is magnified region of the structure shown in FIG. 9.

EXAMPLE 5

This Example serves to illustrate F127-templated methylsilane in AAO (Sample 5).

Sample 5 was prepared by using the following procedure: 3 g of F127 polymer was completely dissolved in 18 g ethanol and 6 g 0.4 M HCl. To this solution 7.7 g of TEOS was added, followed by 3.6 g of methyltrichlorosilane after an hour of stirring. The solution was poured into a Petri dish containing AAO membranes (Whatman, 25 mm diameter, 50 μm thick, 200 nm pores) supported on PDMS blocks. Initially, the solution completely covered the membranes. The solution was allowed to evaporate at room temperature until the membranes were exposed by the receding fluid line. After 24 hours, the membranes were sealed in a jar with 100 g of ethanol and 1 g of KCl. The jar was heated to 80° C. for 2 days to remove the F127 template.

Figure 11:
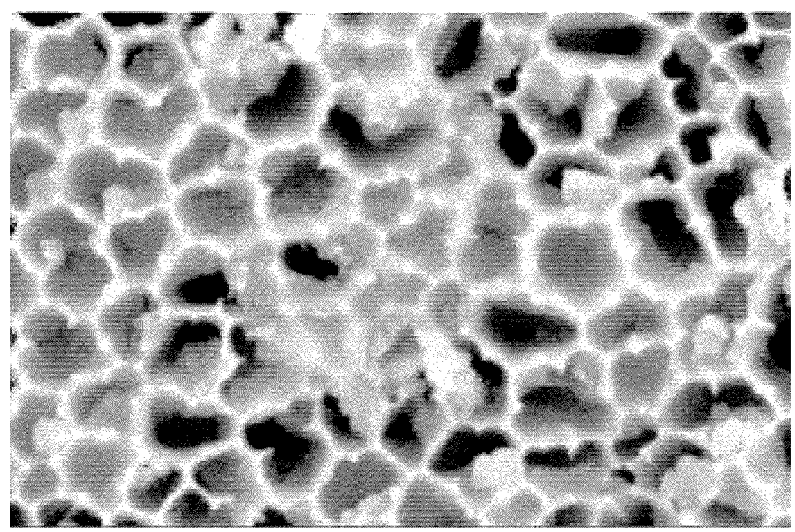
FIGS. 11A and 11B show cross-sectional (B) and plan view (A) SEM images of an AAO membrane that has been filled with F127-templated methylsilane.
Figure 11:
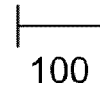
Figure 11:
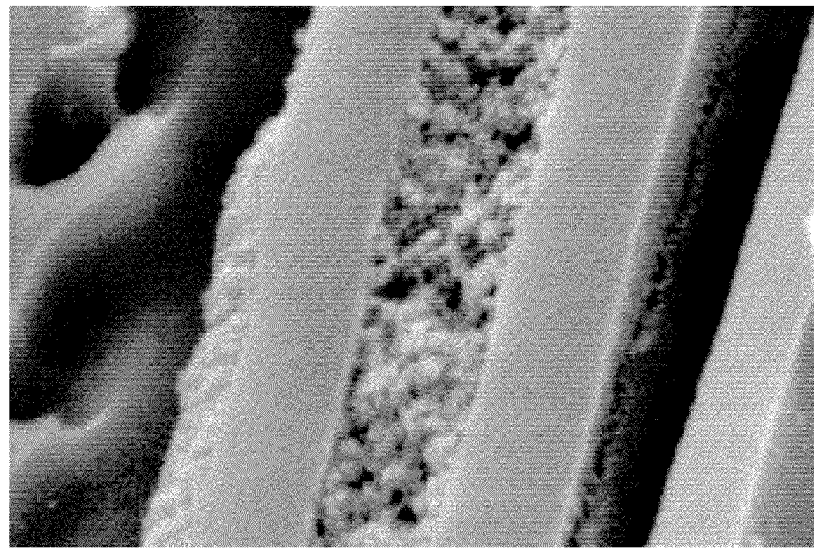
Figure 11:
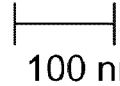

FIGS. 11A and 11B show cross-sectional (B) and plan view (A) SEM images of the resulting AAO membrane that has been filled with F127-templated methylsilane (Sample 5).

EXAMPLE 6

This Example serves to illustrate thermal gravimetric analysis (TGA) and differential thermal analysis (DTA) for some of the Samples generated in the previously-described Examples (and similar samples).

Figure 12:
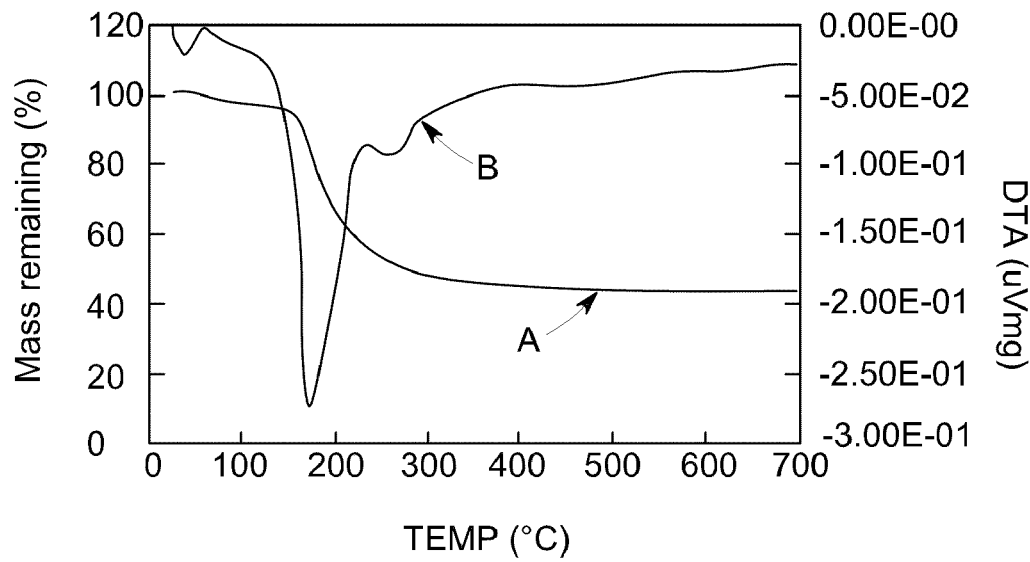
FIG. 12 depicts TGA (trace a) and DTA (trace b) thermal analysis data for templated silica.
Figure 13:
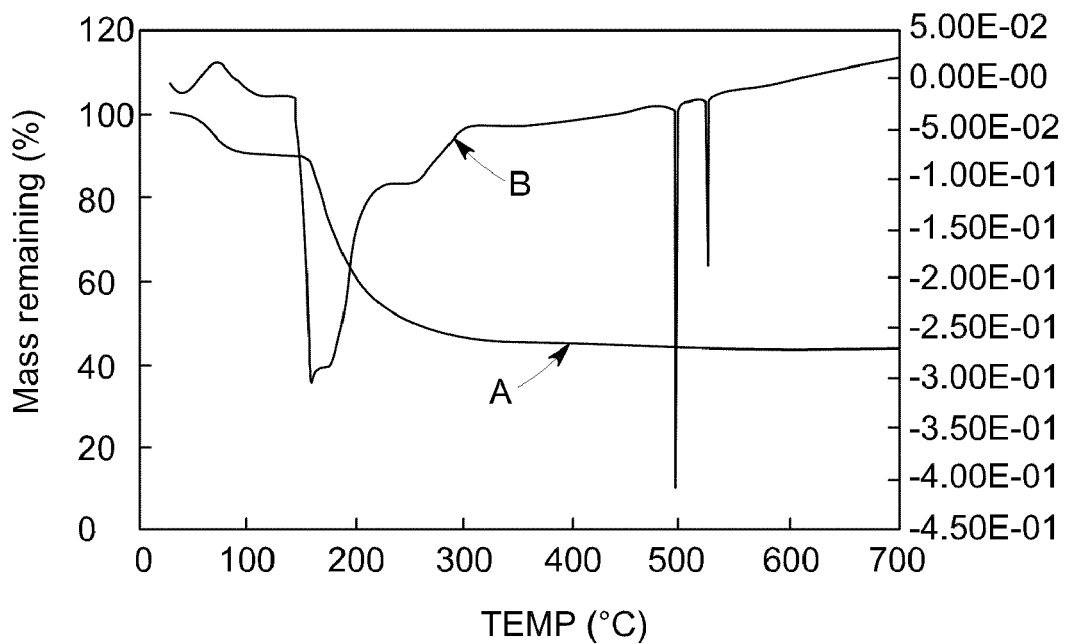
FIG. 13 depicts TGA (trace a) and DTA (trace b) thermal analysis data for templated silica and templated methylsilica
Figure 14:
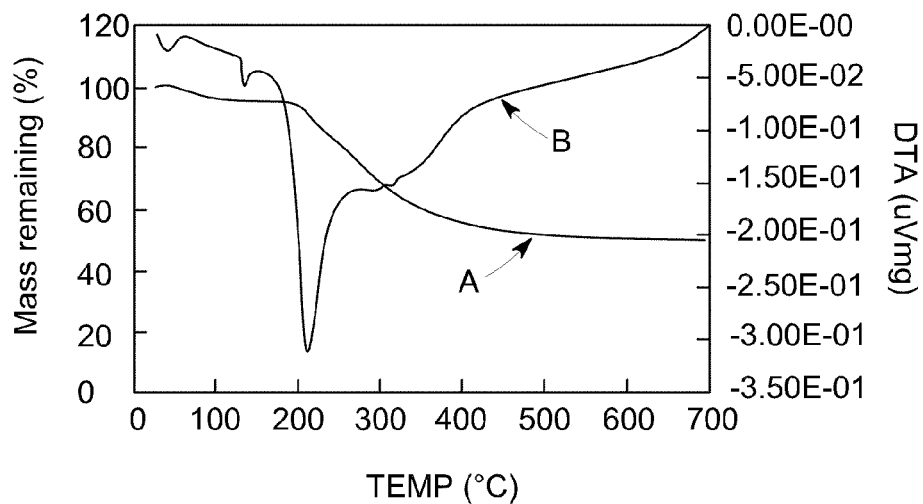
FIG. 14 depicts TGA (trace a) and DTA (trace b) thermal analysis data for templated vinylsilica.
Figure 15:
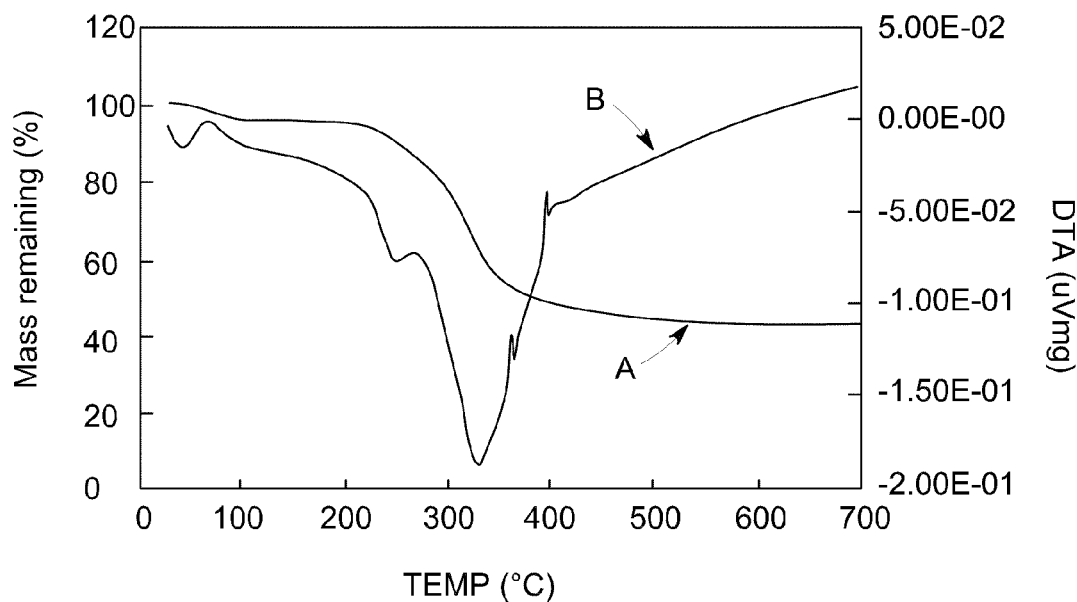
FIG. 15 depicts TGA (trace a) and DTA (trace b) thermal analysis data for templated mercaptosilica.

FIG. 12 depicts TGA (trace a) and DTA (trace b) thermal analysis data for templated silica. FIG. 13 depicts TGA (trace a) and DTA (trace b) thermal analysis data for templated silica and templated methylsilica. FIG. 14 depicts TGA (trace a) and DTA (trace b) thermal analysis data for templated vinylsilica (EXAMPLES 3 and 4). FIG. 15 depicts TGA (trace a) and DTA (trace b) thermal analysis data for templated mercaptosilica (EXAMPLES 1 and 2).

EXAMPLE 7

This Example serves to illustrate infrared spectral data for form of the samples generated in the previously described Examples.

Figure 16:
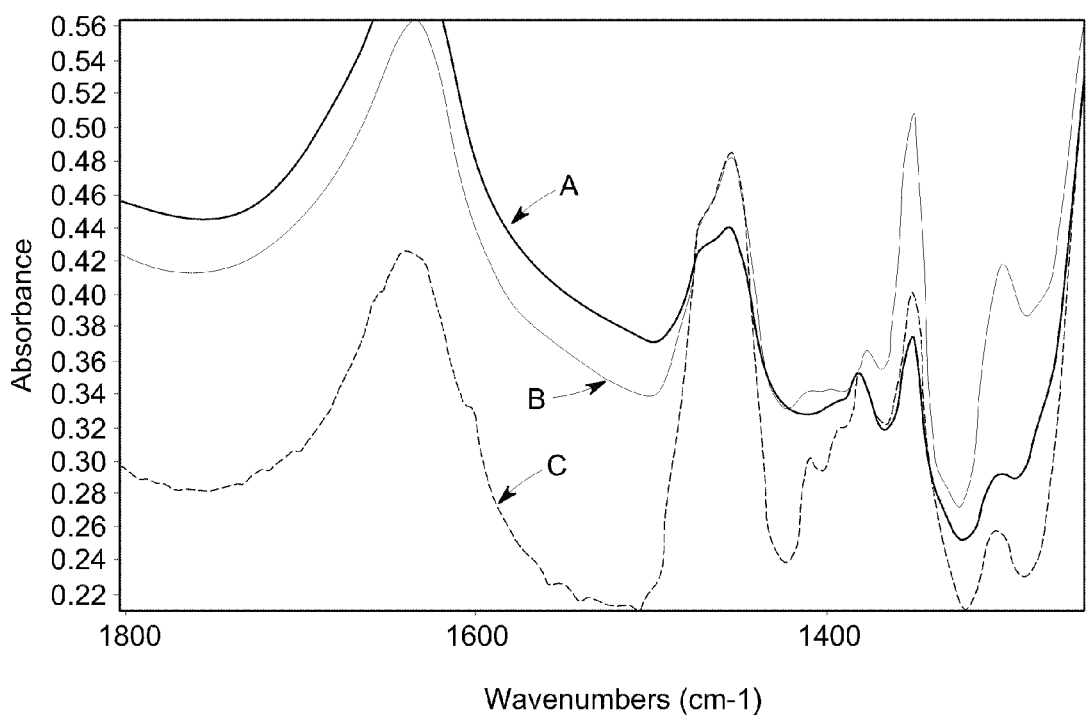
FIG. 16 shows partial IR spectra for methyl-functionalized silica (trace a), mercapto-functionalized silica (trace b), and templated vinylsilica (trace c), where in this region the vinyl peaks in the templated vinylsilica sample (trace c) appear as a shoulder peak at around 1600 cm$^{-1}$.

FIG. 16 shows partial infrared (IR) spectra for methylsilica (trace a), mercapto (trace b), and templated vinylsilica (trace c), where in this region the vinyl peaks in the templated vinylsilica sample (trace c) appear as a shoulder peak at around 1600 $cm^{-1}$.

It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) providing a framework in which a mesoporous ceramic can be generated;
   b) depositing, in a first region of the framework, a first precursor mixture;
   c) treating the first precursor mixture so as to form a region of mesoporous ceramic substructure comprising a first chemical activity;
   d) depositing, in a second region of the framework adjacent to the region of mesoporous ceramic substructure comprising a first chemical activity, a second precursor mixture; and
   e) treating the second precursor mixture so as to form a region of mesoporous ceramic substructure comprising a second chemical activity, wherein the regions of mesoporous ceramic substructure of first and second chemical activity provide for a mesoporous membrane structure comprising regions of mesoporous ceramic, wherein such regions are differentiable by at least one property selected from the group consisting of chemical activity, pore morphology, bulk chemical composition, and compositions thereof;
   wherein both of the first and second precursor mixtures comprise a quantity of a self-assembling surfactant species, a quantity of ceramic precursor, and wherein at least one of the first and second precursor mixtures comprises a species for imparting organic-based chemical activity to the region in which it is present.

2. The method of claim 1, wherein the method provides for a mesoporous membrane structure comprising regions of mesoporous ceramic of different chemical activity.

3. The method of claim 2, further comprising a step of depositing additional precursor mixtures into additional regions of the framework, wherein such additional precursor mixtures are treated so as to form additional regions of mesoporous ceramic substructure comprising additional chemical activities, and wherein this additional precursor mixture deposition and treatment provides for a structure comprising at least three chemically-distinct mesoporous ceramic regions.

4. The method of claim 2, wherein the method provides positional control over the deposition of the first and second precursor mixtures and over placement of the regions of mesoporous ceramic substructure so formed.

5. The method of claim 2, further comprising a step of removing at least part of the framework.

6. The method of claim 5, wherein the framework is completely removed to yield mesoporous ceramic nanorods.

7. The method of claim 6, wherein the chemical activity varies within individual nanorods.

8. The method of claim 6, wherein the chemical activity varies between individual nanorods.

9. The method of claim 2, wherein at least one of the first and second chemical activities is at least partially-derived from organic-based molecules covalently-integrated with the region of mesoporous ceramic substructure with which it is associated.

10. The method of claim 9, wherein the organic-based molecules comprise functional moieties selected from the group consisting of alkyl, mercapto, carboxyl, vinyl, amine, benzyl, and combinations thereof.

11. The method of claim 10, further comprising a step of chemically modifying the functional moieties so as to alter the chemical activity of the mesoporous region in which they are present.

12. The method of claim 11, wherein step of chemically modifying involves treating at least some of the functional moieties in the mesoporous regions in which they are present with a species selected from the group consisting of organic species, organometallic species, metallic species, and combinations thereof.

13. The method of claim 2, wherein the regions of mesoporous ceramic substructure comprise a bulk composition selected from the group consisting of $SiO_2$, $TiO_2$, $Al_2O_3$, $ZrO_2$, $Y_2O_3{:}ZrO_2$, $Y_2O_3$, and combinations thereof.

* * * * *